US008873389B1

(12) United States Patent
Noureddine et al.

(10) Patent No.: US 8,873,389 B1
(45) Date of Patent: Oct. 28, 2014

(54) METHOD FOR FLOW CONTROL IN A PACKET SWITCHED NETWORK

(75) Inventors: Wael Noureddine, Mountain View, CA (US); Asgeir Thor Eiriksson, Sunnyvale, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 988 days.

(21) Appl. No.: 12/853,248

(22) Filed: Aug. 9, 2010

(51) Int. Cl.
*H04J 1/16* (2006.01)
*H04J 3/14* (2006.01)
*H04L 1/00* (2006.01)
*H04L 12/26* (2006.01)
*H04Q 7/24* (2006.01)
*G01R 31/08* (2006.01)
*G06F 11/00* (2006.01)
*G08C 15/00* (2006.01)

(52) U.S. Cl.
USPC .......................................................... 370/231

(58) Field of Classification Search
CPC ..... H04L 47/10; H04L 12/5602; H04L 47/27; H04L 2012/5635
See application file for complete search history.

(56) References Cited

U.S. PATENT DOCUMENTS

| 6,016,319 | A | * | 1/2000 | Kshirsagar et al. | 370/410 |
| 6,035,333 | A | * | 3/2000 | Jeffries et al. | 709/224 |
| 6,118,771 | A | * | 9/2000 | Tajika et al. | 370/328 |
| 6,167,054 | A | * | 12/2000 | Simmons et al. | 370/422 |
| 6,181,699 | B1 | * | 1/2001 | Crinion et al. | 370/392 |
| 6,724,725 | B1 | * | 4/2004 | Dreyer et al. | 370/231 |
| 7,573,815 | B2 | * | 8/2009 | Brzezinski et al. | 370/230 |
| 7,706,255 | B1 | * | 4/2010 | Kondrat et al. | 370/219 |
| 7,761,589 | B1 | * | 7/2010 | Jain | 709/232 |
| 2004/0179476 | A1 | * | 9/2004 | Kim et al. | 370/230 |
| 2006/0088036 | A1 | * | 4/2006 | De Prezzo | 370/395.53 |
| 2006/0092840 | A1 | * | 5/2006 | Kwan et al. | 370/230.1 |
| 2006/0114912 | A1 | * | 6/2006 | Kwan et al. | 370/395.4 |
| 2006/0251120 | A1 | * | 11/2006 | Arimilli et al. | 370/469 |
| 2007/0071014 | A1 | * | 3/2007 | Perera et al. | 370/396 |
| 2007/0268830 | A1 | * | 11/2007 | Li et al. | 370/235 |
| 2008/0025309 | A1 | * | 1/2008 | Swallow | 370/392 |
| 2008/0232251 | A1 | * | 9/2008 | Hirayama et al. | 370/235 |

(Continued)

OTHER PUBLICATIONS

Lu et al., "*Congestion control in networks with no congestion drops*," in Proc. 44th Annual Allerton Conference on Communication, Control, and Computing, Monticello, IL, Sep. 2006.

(Continued)

*Primary Examiner* — Hassan Phillips
*Assistant Examiner* — Prennell Jones
(74) *Attorney, Agent, or Firm* — Beyer Law Group LLP

(57) ABSTRACT

Efficient congestion control in a packet switched network is facilitated between at least one source and at least one destination. The source organizes known destinations, at above the link layer, into groups, each group containing one or more destinations. The group for each source packet may be identifiable by data natively present in the packet header. In some example, the source assigns an arbitrary identification to each group, and the source labels packets destined to a group with the identification for that group. A network node sends "PAUSE" packets containing at least one pause information indication back to a traffic source. The pause indication is associated with at least one group identification used by the source. The source reacts to the pause request by stopping or resuming packet transmission to the at least one group identification. Transmission to other destination groups is not affected.

14 Claims, 4 Drawing Sheets

(56) References Cited

U.S. PATENT DOCUMENTS

| | | | |
|---|---|---|---|
| 2009/0116493 A1* | 5/2009 | Zhu et al. | 370/395.3 |
| 2009/0219818 A1* | 9/2009 | Tsuchiya | 370/236 |
| 2009/0310610 A1* | 12/2009 | Sandstrom | 370/392 |
| 2010/0238804 A1* | 9/2010 | Jain | 370/235 |

OTHER PUBLICATIONS

Barrass, et al., "*Proposal for Priority Based Flow Control*," May 2008, http://www.ieee802.org/1/files/public/docs2008/bb-pelissierpfc-proposal-0508.pdf.

Hugh Barrass, "*Definition for new Pause function,*" May 30, 2007, Revision 1.0, http://www.ieee802.org/1/files/public/docs2007/new-cm-barrass-pause-proposal.pdf.

Henderson et al., "*On improving the fairness of TCP congestion avoidance,*" Global Telecommunications Conference, 1998. GLOBECOM 98. The Bridge to Global Integration. IEEE Issue Date: 1998, pp. 539-544 vol. 1, Nov. 8, 1998-Nov. 12, 1998, Sydney, NSW, Australia.

"*Priority Flow Control: Build Reliable Layer 2 Infrastructure,*" © 2009 Cisco Systems, Inc., http://cisco.biz/en/US/prod/collateral/switches/ps9441/ps9670/white_paper_c11-542809.pdf.

* cited by examiner

METHOD FOR FLOW CONTROL IN A PACKET SWITCHED NETWORK

TECHNICAL FIELD

The present invention relates to flow and congestion control in a packet switched network, with application to intelligent network interface circuitry.

BACKGROUND

In a packet switched network, information is communicated in the form of units (commonly called packets or frames) which are self-contained with respect to the delivery process. In other words, each unit carries sufficient information for it to be delivered to the intended recipient, or recipients. Thus, each packet carries a destination address as well as possibly a source address, which is a necessary ingredient for delivery.

A packet switched network can be broadly said to include end-station nodes linked to intermediate nodes, which "switch" packets received from neighboring nodes, connected to the switch "ports," out on different ports or possibly out on the same port in case of a "hair-pin" turn, according to the destination address of each packet. The "hair-pin" turn is used in conjunction with virtualization and communication between virtual interfaces (or guest Operating Systems) on the same physical server or that use the same physical NIC.

A considerable body of work has been associated with switch architecture, leading to higher performance and improved switch design. Typically, high performance switches today implement non-blocking architectures in that, internally to the switch, a blocked port does not affect traffic going to other ports. A commonly used non-blocking architecture is output queuing, where at each port, ingress packets are placed in queues according to the egress port onto which the packets are to be transmitted. The non-blocking behavior is achieved by preventing packets going to congested ports from entering the actual switching fabric.

It is common that packet switched networks are prone to congestion, typically because they lack access control: a network node does not usually need to ascertain that there are sufficient resources available in the network before transmitting a packet. In contrast, networks where resources are reserved along the path between communicating endpoints do not suffer from this problem. (These are typically called "circuit switched" or "virtual circuit switched" networks.). However, this is achieved at a cost of circuit setup time or resources that remain unused when a circuit is not busy.

For this reason, a principal advantage of packet switched networks compared to circuit switched networks is that they tend to achieve higher utilization efficiency. This is particularly the case for data networks, where traffic load tends to be highly variable over time (bursty).

Network congestion has known detrimental effects on packet-switched networks. In general, network nodes tend to drop packets when they experience congestion. Dropped packets in turn can lead to service quality degradation as perceived at the network application level. In cases where reliable transfer is desired, dropped packets result in wasted resources, increased delays and decreased performance as the dropped data needs to be retransmitted from the source.

Hop-by-hop flow control is known. Back-pressure signals are exchanged between neighboring nodes on a link to suspend or resume transmission on the link. Hop-by-hop back-pressure can alleviate the effects of congestion by spreading the packet buffering requirements over multiple nodes. However, it does not extend the non-blocking property of a switch to the paused neighbors and, therefore, may result in congestion in one node spreading through the network.

An IEEE standard for flow control in Ethernet networks specifies the format of a packet (frame) which can be transmitted by an Ethernet node to request transmission of packets to be suspended (paused) at neighboring nodes (hop-by-hop) for a specified period of time. This PAUSE frame can also be used to resume transmission when desired. Recent work in the IEEE on improving the discrimination capabilities of PAUSE has focused on segregating between a limited number of traffic types or "classes", which has no impact on the problem of congestion propagation within a certain traffic class.

For example, FIG. 1 is a block diagram illustrating a simple example of such a network. Referring to FIG. 1, Switch1 is shown as receiving a Pause indication 108 from another switch (not shown). A corresponding pause indication 106 is provided from Switch1 to Switch0. Finally, a yet still corresponding pause indication 104 is provided to NIC 102. The NIC 102 is, for example, a network interface controller configured to offload TCP/IP processing from a host. The pause indication 104 provided to the NIC 102 is an indication to the NIC 102 to suspend transmission of packets to Port0 of NIC 102 for a specified period of time.

SUMMARY

Efficient congestion control in a packet switched network is facilitated between at least one source and at least one destination. The source organizes known destinations into groups, each group containing one or more destinations. The group for each source packet may be identifiable by data natively present in the packet header. In one example, the source assigns an arbitrary identification to each group, and the source labels packets destined to a group with the identification for that group.

A network node sends "PAUSE" packets containing at least one pause information indication back to a traffic source. The pause information indication is associated with at least one group identification used by the source. The source reacts to the pause request by stopping or resuming packet transmission to destinations corresponding to the at least one group identification. Transmission to other destination groups, from the source, is not affected by the pause request.

DETAILED DESCRIPTION

Figure 1:
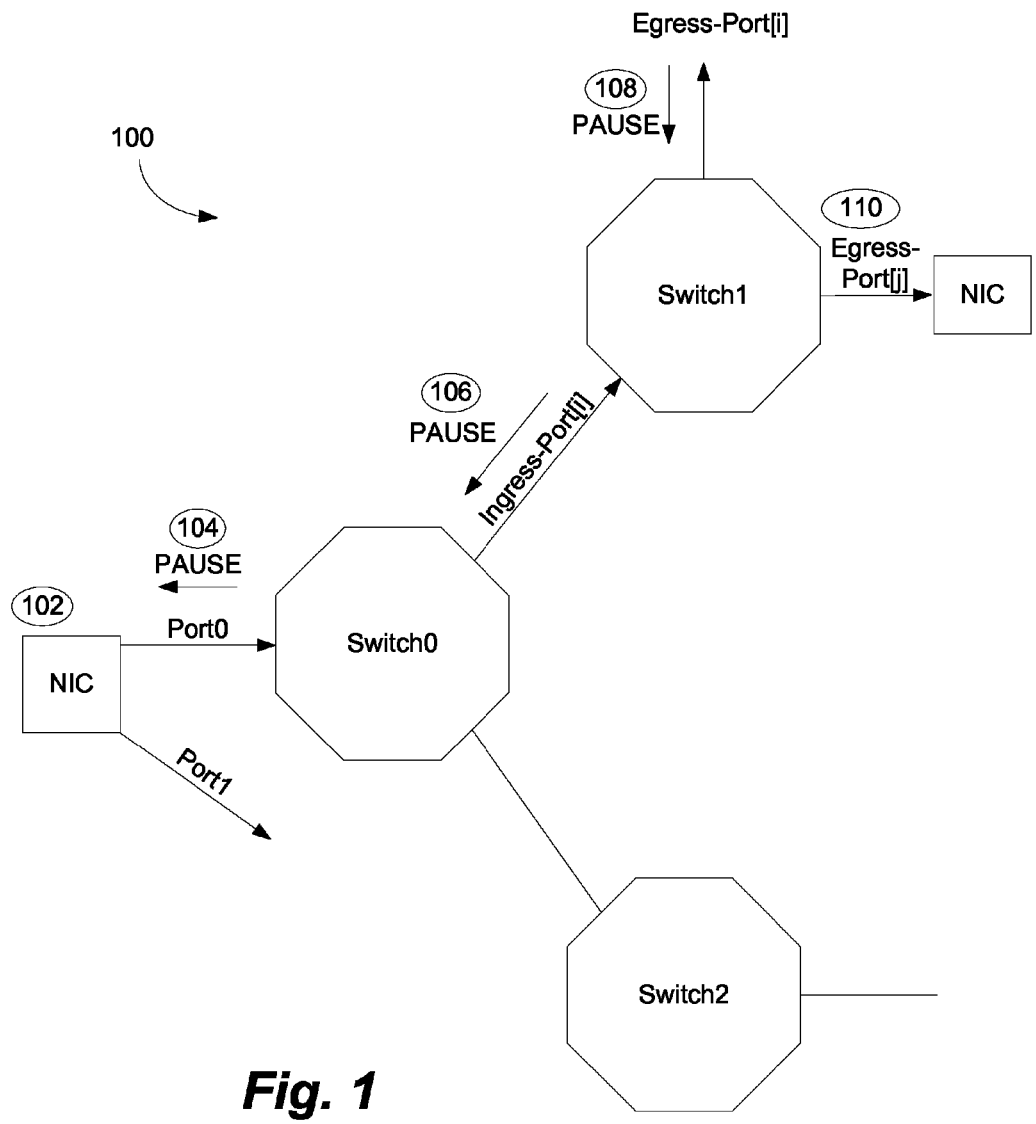
FIG. 1 illustrates a system including a plurality of source nodes that may communicate with a plurality of destination nodes via a packet switched network.

The inventors have realized that deployment of indiscriminate PAUSE in actual networks has suffered from the incidence of congestion propagation through the network, including parts where no congestion would otherwise have been experienced. This effect is often associated with head-of-line (HOL) blocking, when a packet destined to a node along an uncongested path, finds its path blocked by another packet whose own path is blocked due to congestion in its path. This dependence is created due to the indiscriminate PAUSE of traffic on a link, independently of the actual destination of each packet.

More specifically, for example, a particular NIC may have frame1 that is going to a switch output port P1 that is congested, and behind frame1 there is frame2 from the same NIC that is going to port P2 that is not congested. Due to indiscriminate use of the PAUSE of traffic on a link, the NIC may be paused for frame2 even though frame 2 should not experience congestion on the path from port P2. A similar situation may arise at a switch ingress port that is receiving frames, where some received frames are destined to congested ports while other received frames are not destined to congested ports. As mentioned above, these two HOL blocking effects lead to PAUSE propagation in the network.

Work on improvements to the PAUSE specification is in progress within the IEEE standards body, where the ability to differentiate between up to eight classes (types) of traffic may be added to the PAUSE specification. This is known as "Convergence Enhanced Ethernet," or CEE. While this capability may lessen the impact of the aforementioned problem from spreading among different traffic types, the inventors realized that it does not entirely address the basic congestion propagation problem. For example, the proposed CEE specifications do not take into account the destinations that are associated with the classes of traffic.

End-to-end congestion control is typically implemented at the network hosts. A popular protocol with end-to-end congestion control is the Transmission Control Protocol (TCP), which provides reliable transfer in the Internet protocol stack. TCP reacts to congestion in round-trip-time granularity, and depending on the implementation, may not effectively react to congestion caused by short bursts. See, for example, the article entitled "Improving the Fairness of TCP Congestion Avoidance", 1997, by Thomas R. Henderson et al.

Given the realization of disadvantages in the currently-implemented PAUSE function, the inventors have realized that it may be advantageous to apply congestion control to groups of packets organized by source and one or more destinations in packet switched networks. In this application, the method is described, for the sake of illustration, in the context of Ethernet, which is the most popular packet switched technology today. However, it applies to generalized packet switched networks.

In one example, one or more traffic sources connected to a packet switched network organize known data link layer destinations into groups. For example, the traffic source may categorize the known destinations (an example is a host routing table with one or multiple default routes) into groups, each with one or more destinations. Multiple paths may exist to a particular destination, and the source may therefore have multiple entries for one destination categorized in different destination groups. A source may be an end station or a network switch. The source may label each outgoing packet with an indication of a chosen group to which the destination of that packet belongs. For example, the traffic source may assign an arbitrary identification number or other indication to each group and label the packets destined to a group with the group's identification number.

A network node sends "PAUSE" packets containing at least one pause information indication back to a traffic source. The pause information indication is associated with at least one destination group determined by the source. The source reacts to the pause request by appropriately stopping or resuming packet transmission to destinations in the group. Transmission to destinations in other groups is not affected. By pausing based on destination, the HOL blocking effect may be minimized or avoided.

In one example, the packet destination group indication may be a tag, similar to the VLAN tag as used in Ethernet.

In operation, a source node may pause transmission to a particular destination group through a neighbor node if instructed to do so by the neighbor node via a pause indication. The source node may resume transmission to the particular destination group through the neighbor node if so instructed by the neighbor node.

The number of destinations included in a group may range from a single destination (as may be available, for example, in a routing table such as a forwarding database of an Ethernet switch), all the way up to an "all destinations" group.

Use of the described method may be independent of priority PAUSE and can be used alongside it and integrated with it. It is possible to associate each pause indication with a particular priority or priority group, and only act on the information for the associated priorities.

The inventors realize that this scheme can be valuable in the context of intelligent NICs, where routing table information is made available to the NIC.

Figure 2:
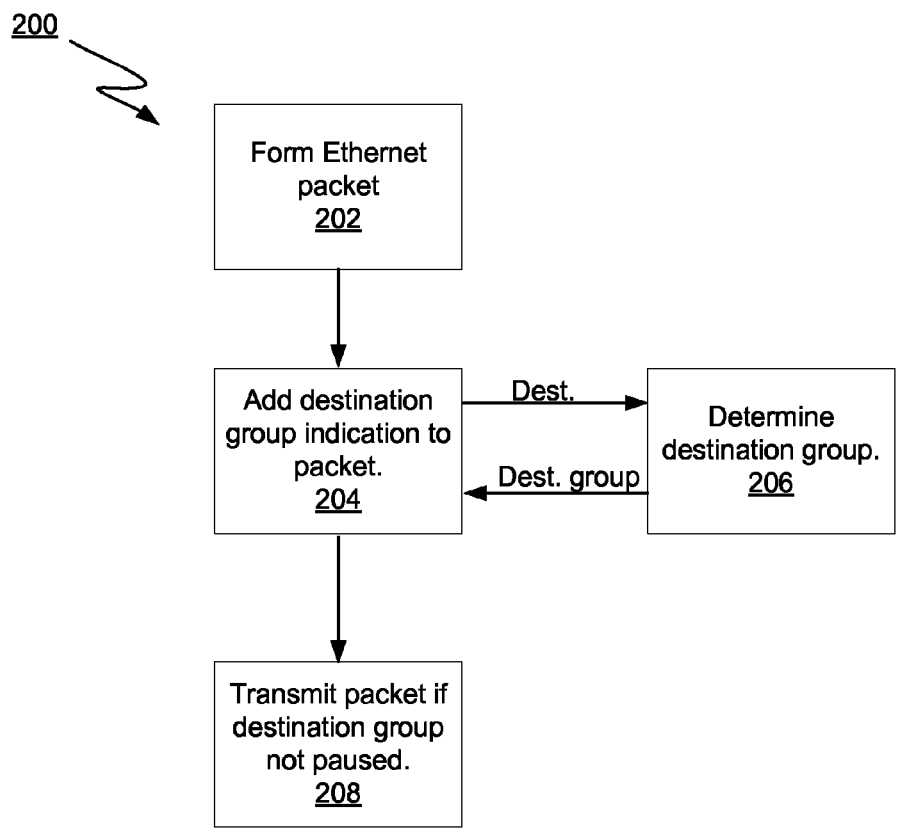
FIG. 2 illustrates processing with a source node configured to include a destination group label, at a link-layer, in a link layer header of transmitted packets.

We now describe an example of a source node operating in accordance with an embodiment. Referring to FIG. 2, functionality of a network node 200 is illustrated. The FIG. 2 network node 200 may be, for example, an intelligent network interface controller including TCP offload engine capability. As shown in FIG. 2, Ethernet packet forming functionality 202 within the network node 200 forms an Ethernet packet to encapsulate higher-layer data (such as a TCP packet generated by the TCP offload engine capability of the network node 200. Label-adding functionality 204 provides a destination indication to destination group determining functionality 206, which may be, for example, a lookup table or more sophisticated functionality such as a routing table. An indication of a destination group is provided back to the label-adding functionality 204, which adds a label to the Ethernet packet. Then transmit packet functionality 208 causes the Ethernet packet to be transmitted out over the network, if the destination group is one for which the node 200 has not received a PAUSE indication from the network. The source node can avoid HOL by subjecting the packet generation step to a destination group based pause check, and only proceeding with packet forming when the relevant destination group is not paused.

Figure 3:
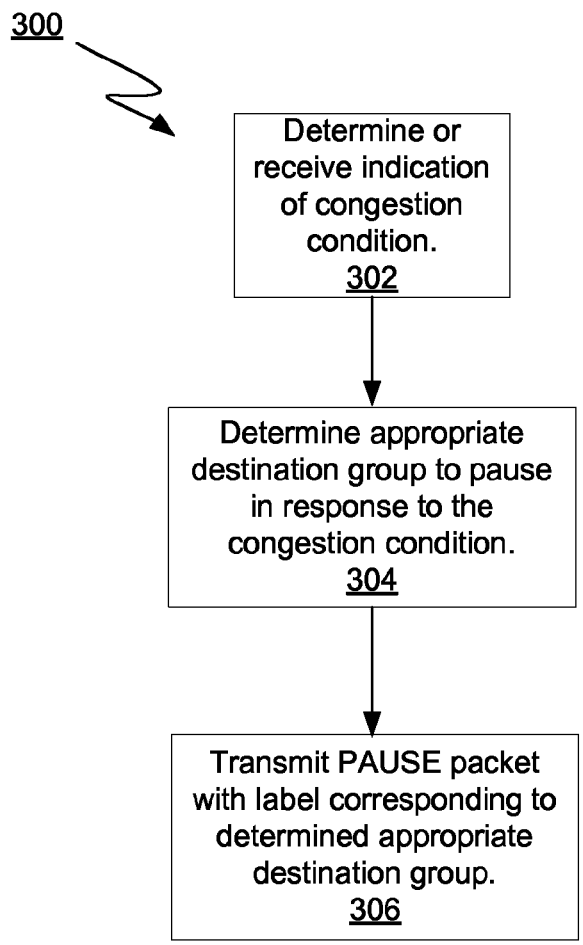
FIG. 3 illustrates processing within a switch configured to provide a PAUSE indication to indicate a particular destination group, including destinations for which packets are to be paused.

The functionality of a switch in accordance with aspect of the invention is, in many ways, similar to conventional switch functionality. However, significantly, the switch functionality also includes functionality to determine a particular destination group for a PAUSE indication. Referring to FIG. 3, an example of switch 300 functionality is broadly illustrated. Functionality 302 is provided to determine or receive an indication of a congestion condition. Functionality 304 is provided to determine an appropriate destination group to pause in response to the congestion condition. Determining an appropriate destination group may include, for example, observing a destination group indication in one or more packets that caused or contributed to the congestion condition. As another example, determining an appropriate destination group by a switch may include determining a destination group indication based on the destination in a packet. For example, the criteria by which the switch may determine the destination group may have been set in the switch by use of a network management application. Finally, functionality 306 is provided to transmit a PAUSE indication back to a source node (such as, for example, another switch or an end station node), the PAUSE indication including an indication of the determined destination group.

Figure 4:
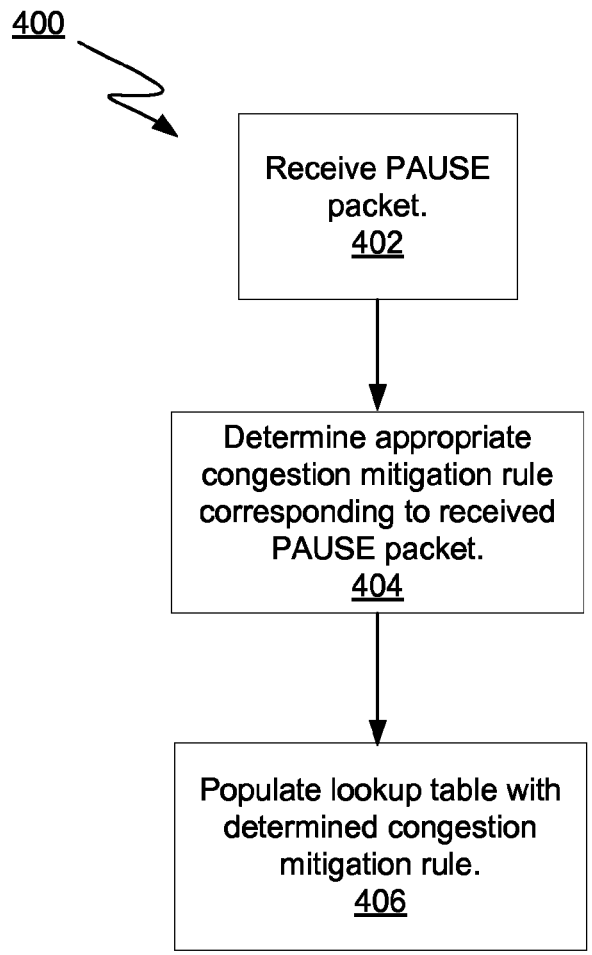
FIG. 4 illustrates an example of how a source node operates with respect to PAUSE indications received by that node.

FIG. 4 broadly illustrates functionality in the source node when a packet is to be transmitted (402). At 404, the source node determines an appropriate congestion mitigation rule corresponding to the received PAUSE packet. At 406, the source node populates a lookup table with the determined congestion mitigation rule. The lookup table may be, for example, a content addressable memory configurable to receive a data item and provide an index for that data item, where the index is a pointer to an action to take in association with the data item. Furthermore, the content addressable memory may be configurable to utilize masks to indicate "don't care" values for portions of the entries while determining whether a particular entry in the content addressable memory is a match. Thus, for example, the congestion mitigation rule may be the data item provided to the content addressable memory and the resulting index may be an indication of an action to take (for example, simply to not transmit packets matching this congestion mitigation rule) in response to the match of the congestion mitigation rule to the entry in the content addressable memory. In other examples, congestion mitigation may not include a complete stoppage of transmitting packets but, rather for example, the PAUSE packet provided by the switch may indicate a partial pausing of packets matching the congestion mitigation rule. In such a case, the action indication may have been populated to indicate the partial pausing of packets. In yet another example, the congestion mitigation rule may specify a rate limit to be applied to traffic matching the rule, rather than a pause.

While the discussion above has been in terms of link-layer neighbor destinations (such as ARP neighbors), in some examples, the group indication may be an indication of other properties of the network transmission. For example, where such information is maintained (such as in an offload NIC having TCP/IP offload engine functionality and, more specifically, an offload NIC that supports virtual machines operating on a host), the group indication may be an indication of a Source MAC (SMAC) address index, a Destination MAC (DMAC) address index, a virtual NIC number, a virtual interface number, etc. In other words, while the destination group (ARP neighbor, routing entry) may be very sensible, in some contexts there is benefit in grouping based on other criteria.

Furthermore, in some examples, multiple tags are included within each packet, whether as a natural consequence of the standard network protocols involved in the network communication or due to added functionality in the source nodes. Thus, as just one example, some types of congestion may require stopping traffic to one destination for all virtual machines, and all traffic from a particular virtual machine. Using these tags, such a requirement may be fulfilled. Furthermore, by employing a content addressable memory such as is discussed above, determination of the presence of the tags may be performed easily by using the various masks corresponding to the tags where, for example, a mask may be used to indicate that a particular tag is "don't care" with respect to application of a particular PAUSE rule.

We have thus described examples of PAUSE deployments in which a discriminating PAUSE functionality may be provided, such as by destination groups and/or other factors. In this way, packets not matching particular PAUSE rules may be transmitted without being impeded by a PAUSE rule that is not directly applicable to that packet. This can improve the efficiency of use of the network while still effectively addressing congestion that is occurring in particular parts of the network.

What is claimed is:

1. A method to facilitate congestion control in a packet switched network comprising a plurality of nodes including a packet source node, the method comprising:
   at the packet source node, maintaining a plurality of link-layer packet destination groups for each of at least some of a plurality of packets being provided, at above a link-layer, from the packet source node to destination nodes via at least one node of the network;
   at the packet source node, receiving at least one pause packet from another node of the network, the pause packet indicating one of the packet destination groups; and
   at the packet source node, moderating transmission, from the packet source node, of packets destined for a destination in the packet destination group indicated by the received pause packet,
   wherein moderating transmission, from the packet source node, of packets destined for a destination in the packet destination group indicated by the received pause packet includes setting a particular non-zero rate of transmission, from the packet source node, of packets destined for a destination in the packet destination group indicated by the received pause packet.

2. The method of claim 1, wherein:
   at least one of the packets being provided from the packet source node to destinations nodes via nodes of the network include a label that is indicative of the packet destination group to which the destination of that packet belongs.

3. The method of claim 2, wherein:
   the label is a packet tag.

4. The method of claim 1, wherein:
   the other node, from which the pause packet is received, is a neighbor node of the packet source node.

5. The method of claim 1, wherein:
   the source node maintains a host routing table, and
   maintaining a plurality of packet destination groups includes maintaining, in the host routing table, a correspondence of routes to packet destination groups.

6. The method of claim 1, wherein, for at least some of the packet destinations,
   the packet source node is aware of multiple paths to that packet destination; and
   at least one of the paths to that packet destination is within a packet destination group that is different from a packet destination group for at least one other path to that packet destination.

7. A method to facilitate congestion control in a packet switched network comprising a plurality of nodes including a switch node, the method comprising:
   by the switch node, determining that the network is congested with respect to traffic destined to at least one particular destination;
   by the switch node, in response to the determination that the network is congested with respect to traffic destined to the at least one particular destination and based at least in part on a destination group indication in at least one first packet being routed by the switch including the at least one particular destination, providing a first pause packet to a source of the at least one first packet, the first pause packet including an indication of the destination group;

by the switch node, determining that the network is no longer congested with respect to traffic destined to the at least one particular destination; and by the switch node, in response to the determination that the network is no longer congested with respect to traffic destined to the at least one particular destination, providing a second pause packet to the source of the at least one first packet, the second pause packet including an indication of the destination group.

8. A method to facilitate congestion control in a packet switched network comprising a plurality of nodes including a packet source node, the method comprising:

at the packet source node, maintaining a plurality of link-layer packet destination groups for each of at least some of a plurality of packets being provided, at above a link-layer, from the packet source node to destination nodes via at least one node of the network, wherein each link-layer packet destination group is indicative of a unique combination of at least one characteristic of the packets;

at the packet source node, receiving at least one pause packet from another node of the network, the pause packet indicating one of the link-layer packet destination groups; and at the packet source node, moderating transmission, from the packet source node, of packets destined for a destination in the link-layer packet destination group indicated by the received pause packet, wherein moderating transmission, from the packet source node, of packets destined for a destination in the packet destination group indicated by the received pause packet includes setting a particular non-zero rate of transmission, from the packet source node, of packets destined for a destination in the packet destination group indicated by the received pause packet.

9. The method of claim 8, wherein:

the at least one characteristic includes, for packets to be formed by an offloading network interface controller (NIC), at least one of a Source MAC (SMAC) address index, a Destination MAC (DMAC) address index, a virtual NIC number, and a virtual interface number.

10. A method to facilitate congestion control in a packet switched network comprising a plurality of nodes including a packet source node, the method comprising:

by the switch node, determining that the network is congested with respect to packets having a particular destination;

by the switch node, in response to the determination that the network is congested with respect to packets having the particular destination, providing a first pause packet to a source of the at least one first packet, the first pause packet including an indication of a destination group to which the particular destination belongs;

by the switch node, determining that the network is no longer congested with respect to traffic destined to the at least one particular destination; and by the switch node, in response to the determination that the network is no longer congested with respect to traffic destined to the at least one particular destination, providing a second pause packet to the source of the at least one first packet, the second pause packet including an indication of the destination group.

11. The method of claim 10, wherein:

providing the first pause packet including the indication of the destination group to which the particular destination belongs includes determining the destination group based on an indication of the particular destination in at least one of the packets having the particular destination.

12. The method of claim 10, wherein:

providing the first pause packet including the indication of the destination group to which the particular destination belongs includes determining the destination group based on an indication of the destination group in at least one of the packets having the particular destination.

13. A packet source network node device configured to operate in a packet-switched network including to facilitate congestion control in a packet switched network comprising a plurality of nodes including the packet source network node, the device configured to:

maintain a plurality of link-layer packet destination groups for each of at least some of a plurality of packets being provided, at above a link-layer, from the packet source node to destination nodes via at least one node of the network;

receive at least one pause packet from another node of the network, the pause packet indicating one of the packet destination groups; and moderate transmission, from the packet source node, of packets destined for a destination in the packet destination group indicated by the received pause packet, wherein moderating transmission, from the packet source node, of packets destined for a destination in the packet destination group indicated by the received pause packet includes setting a particular non-zero rate of transmission, from the packet source node, of packets destined for a destination in the packet destination group indicated by the received pause packet.

14. A switch node network device configured to operate in a packet switched network comprising a plurality of nodes including the switch node, the device configured to:

determine that the network is congested with respect to traffic destined to at least one particular destination;

in response to the determination that the network is congested with respect to traffic destined to at least one particular destination and based at least in part on a destination group indication in at least one first packet being routed by the switch including the at least one particular destination, provide a first pause packet to a source of the at least one first packet, the first pause packet including an indication of the destination group;

by the switch node, determining that the network is no longer congested with respect to traffic destined to the at least one particular destination; and by the switch node, in response to the determination that the network is no longer congested with respect to traffic destined to the at least one particular destination, providing a second pause packet to the source of the at least one first packet, the second pause packet including an indication of the destination group.

* * * * *